(12) United States Patent
Shimizu et al.

(10) Patent No.: US 6,483,312 B2
(45) Date of Patent: Nov. 19, 2002

(54) CYLINDER DISCRIMINATION DEVICE AND CYLINDER DISCRIMINATION METHOD OF ENGINE

(75) Inventors: Hirokazu Shimizu, Atsugi (JP); Noriaki Shimizu, Fujisawa (JP)

(73) Assignees: Unisia Jecs Corporation, Kanagawa-ken (JP); Nissan Motor Co., Ltd., Kanagawa-ken (JP)

( * ) Notice: Subject to any disclaimer, the term of this patent is extended or adjusted under 35 U.S.C. 154(b) by 10 days.

(21) Appl. No.: 09/789,569

(22) Filed: Feb. 22, 2001

(65) Prior Publication Data

US 2001/0019267 A1 Sep. 6, 2001

(30) Foreign Application Priority Data

Feb. 22, 2000 (JP) ........................................ 2000-044553
Feb. 22, 2000 (JP) ........................................ 2000-044554

(51) Int. Cl.⁷ ............................................... F02P 17/00
(52) U.S. Cl. ..................................................... 324/391
(58) Field of Search ............................... 324/391, 378; 123/406.12, 406.18, 406.58; 73/116

(56) References Cited

U.S. PATENT DOCUMENTS

| | | | | |
|---|---|---|---|---|
| 4,932,380 A | * | 6/1990 | Kobayashi et al. | 123/478 |
| 5,060,614 A | * | 10/1991 | Uchimi et al. | 123/414 |
| 5,494,017 A | * | 2/1996 | Miyata et al. | 123/414 |
| 5,979,413 A | * | 11/1999 | Ohnuma et al. | 123/491 |
| 6,138,636 A | * | 10/2000 | Kohno et al. | 123/198 F |
| 6,357,423 B1 | * | 2/2002 | Kanno | 123/497 |

FOREIGN PATENT DOCUMENTS

JP 05-106500 4/1993

* cited by examiner

*Primary Examiner*—N. Le
*Assistant Examiner*—Etienne LeRoux
(74) *Attorney, Agent, or Firm*—Sughrue Mion, PLLC

(57) ABSTRACT

An internal combustion engine is equipped with a plurality of cam sensors that output cylinder discrimination signals during every uneven crank angle interval, and specific cylinders are discriminated based on said cylinder discrimination signals output from said plurality of cam sensors. Based on the discrimination result of said specific cylinder and said cylinder discrimination signals from cam sensors, the cylinders other than said specific cylinders are discriminated.

24 Claims, 15 Drawing Sheets

| RESULT OF CYLINDER DISCRIMINATION | NUMBER OF PHASE1 INPUT | NUMBER OF PHASE2 INPUT |
|---|---|---|
| #1cyl | 2 | 0 |
| #2cyl | 0 | 1 |
| #3cyl | 1 | 2 |
| #4cyl | 0 | 2 |
| #5cyl | 1 | 0 |
| #6cyl | 2 | 1 |
| ERROR | OTHER THAN ABOVE ||

FIG.9A

INITIAL REF DETECTION (WHEN #CYLBU = 0)

| REF, CYLCS | METHOD OF DETECTION |
|---|---|
| #2 | INPUT OF PHASE2 WHICH IS INPUT WHEN BCAMCNT1 ≥ 3 |
| #5 | INPUT OF PHASE1 WHICH IS INPUT WHEN BCAMCNT2 ≥ 3 |

FIG.9B

REF DETECTION DURING NORMAL STATUS (WHEN #CYLBU = 1)

| REF, CYLCS | METHOD OF DETECTION |
|---|---|
| #1 | INPUT OF PHASE1 BY WHICH BREFCAM1 = 3 |
| #2 | INPUT OF PHASE2 WHICH IS INPUT WHEN BCAMCNT1 ≥ 3 |
| #3 | INPUT OF PHASE2 BY WHICH BREFCAM2 = 1 |
| #4 | INPUT OF PHASE2 BY WHICH BREFCAM2 = 3 |
| #5 | INPUT OF PHASE1 WHICH IS INPUT WHEN BCAMCNT2 ≥ 3 |
| #6 | INPUT OF PHASE1 BY WHICH BREFCAM1 = 1 |

FIG.13

RETRIEVE CYLCS

| CYLCS | #FLGGRP | BCAMCNT |
|-------|---------|---------|
| 1 | 0 | 0 |
| 2 | 0 | 2 |
| 3 | 0 | 4 |
| 4 | 1 | 0 |
| 5 | 1 | 2 |
| 6 | 1 | 4 |

CYLINDER DISCRIMINATION DEVICE AND CYLINDER DISCRIMINATION METHOD OF ENGINE

FIELD OF THE INVENTION

The preset invention relates to a device and a method for discriminating cylinders of an engine, and specifically relates to a technique for discriminating cylinders coping with an abnormal time.

DESCRIPTION OF THE RELATED ART

As the conventional cylinder discrimination device, there is known such a device in which cylinder discrimination signals of the number corresponding to the number of cylinders are output from a cam sensor during an output of reference crank angle signal from a crank angle sensor, to perform cylinder discrimination (Japanese Unexamined Patent Publication No. 5-106500).

However, in a 6-cylinder engine for example, there is a need to provide to a signal plate for outputting cylinder discrimination signals a maximum of six units to be detected during the output of reference crank angle signal. The problem of this conventional device is that the signal plate cannot be miniaturized, especially for a construction in that a magnetic sensor is used to detect projections formed thereto.

Therefore, there is considered a cylinder discrimination device having a plurality of cam sensors provided in correspondence to a plurality of camshafts, wherein cylinder discrimination is performed during the output of a signal for detecting the reference crank angle position from a crank angle sensor based on the combination of the numbers of signal output from each of the plurality of cam sensors, even when only a small number of units to be detected are formed to the signal plate.

However, according to the above-mentioned cylinder discrimination device, it is necessary to ensure the cylinder discrimination (detection of reference crank angle positions corresponding to cylinders) to be performed in case of failure of the crank angle sensor.

SUMMARY OF THE INVENTION

The present invention has been achieved taking into consideration the abovementioned problems and has an object to enable cylinder discrimination to be performed based only on signals output from cam sensors of an engine.

Another object of the invention is to enable cylinder discrimination to be performed using a signal from a crank angle sensor during a normal condition, and to be performed discrimination based only on signals output from cam sensors when the crank angle sensor is malfunctioning.

Moreover, the object of the present invention is to enable cylinder discrimination to be applied especially to an engine where a rotation phase of a camshaft with respect to a crankshaft can be variably controlled in order to variably control the valve timing of intake and exhaust valves.

In order to achieve the above objects, the present invention is constituted as follows.

There is provided a plurality of cam sensors outputting cylinder discrimination signals at every uneven crank angle interval.

A specific cylinder is discriminated based on the cylinder discrimination signals output from the plurality of cam sensors.

Cylinders other than the specific cylinder are discriminated based on the discriminated result of the specific cylinder and the cylinder discrimination signals from the cam sensors.

According to the present invention having the abovementioned constitution, the cylinder discrimination signals are output from the respective cam sensors at every uneven crank angle interval, so that a specific cylinder can be discriminated for example by measuring the output interval of the signals or counting the number of output of the signals, and moreover, cylinders other than the specific cylinder can be discriminated based on the discrimination result and the cylinder discrimination signals further output from the cam sensors.

According to this constitution, cylinder discrimination can be performed based only on the cylinder discrimination signals from the cam sensors.

Here, the specific cylinder may be discriminated based on the output characteristics of cylinder discrimination signals from another cam sensor during the period of time from the previous output until the current output of cylinder discrimination signals from the respective cam sensors.

According to this constitution, the output characteristics of the cylinder discrimination signals of the plurality of cam sensors can be set so as to be different, for a predetermined time, from the output characteristics of the cylinder discrimination signals from the another cam sensor during the period of time from the previous output until the current output of cylinder discrimination signals from the respective cam sensors. Thereby, the specific cylinder can be discriminated from the other cylinders.

In the above case, the number of output of cylinder discrimination signals from the another cam sensor may be counted during the period of time from the previous output until the current output of cylinder discrimination signals from the respective cam sensors, so that the specific cylinder can be discriminated depending on a difference in the number of signal output.

According to this constitution, by setting the number of output of cylinder discrimination signals output from the another cam sensor during the output interval of cylinder discrimination signals from the respective cam sensors so as to be different for a predetermined output interval, from the other output intervals, the specific cylinder can be discriminated from the other cylinders depending on the difference in the number of signal output.

Moreover, the cycle of input interval of the cylinder discrimination signals may be measured while cylinder discrimination signals output from the respective cam sensor are sequentially input, so that, based on a ratio of the most newly measured cycle and the previously measured cycle, and the discrimination of the cam sensor from which the newest cylinder discrimination signal has been output, the specific cylinder can be discriminated.

According to this constitution, the characteristics of the ratio between the newest value and the previous value of the crank angle interval for every cylinder discrimination signal sequentially output from the plurality of cam sensors can be set so that those of when the cylinder discrimination signals are output from the specific cylinder differ from those of when the cylinder discrimination signals are output from the other cylinders. Thereby, the specific cylinder can be discriminated from the other cylinders based on the ratio between the newest cycle and the previous cycle of cylinder discrimination signal input interval, and the discrimination of the cam sensor.

In the above case, the specific cylinder may also be discriminated when a value obtained by dividing the most newly measured cycle by the previously measured cycle exceeds a threshold value.

According to this constitution, if the newest value/previous value of crank angle interval for every cylinder discrimination signal of cam sensors is set to be greater during the cylinder discrimination signal output corresponding to the specific cylinder than during cylinder discrimination signal output corresponding to other cylinders, the (most newly measured cycle)/(previously measured cycle) value exceeds the threshold value only when the cylinder discrimination signal output corresponding to the specific cylinder. Thus, the specific cylinder can be discriminated from the other cylinders.

Furthermore, the cylinders other than the specific cylinder may be discriminated depending on the number of output of cylinder discrimination signals from a cam sensor corresponding to a cylinder to be discriminated, immediately after the specific cylinder has been discriminated.

According to this constitution, by setting the number of output of cylinder discrimination signals output from a predetermined cam sensor after the output of the cylinder discrimination signal that determines the specific cylinder so as to correspond to each of the cylinders other than the specific cylinder, the cylinders other than the specific cylinder can each be discriminated based on the number of signal output.

Even further, the cylinders other than the specific cylinder may also be discriminated depending on the total number of output of cylinder discrimination signals from the respective cam sensors, immediately after the specific cylinder has been discriminated.

According to this constitution, by setting the total number of output of the cylinder discrimination signals output from all the cam sensors after the cylinder discrimination signal for determining the specific cylinder has been output to correspond to each cylinder other than the specific cylinder, the cylinders other than the specific cylinder can be discriminated based on the total number of output.

Moreover, the constitution may be such that there is provided a crank angle sensor that outputs, in synchronism with the rotation of a crankshaft, a crank angle signal capable of detecting a reference crank angle position for every stroke phase difference between the cylinders, and during a regular condition, cylinder discrimination is performed based both on a reference crank angle position detected based on the crank angle signal from the crank angle sensor and cylinder discrimination signals from the cam sensors, while performing abnormality diagnosis of the crank angle sensor, and cylinder discrimination is performed based only on the cylinder discrimination signals output from the plurality of cam sensors when the crank angle sensor is diagnosed to be abnormal.

According to this constitution, when the crank angle sensor is working normally, the cylinder corresponding to the reference crank angle position can be discriminated to carry out highly accurate engine control (ignition timing control, fuel injection control and so on), while detecting the reference crank angle position with high accuracy based on the crank angle signal output in synchronism with the rotation of the crankshaft. Moreover, the cylinder discrimination can be performed even when the crank angle sensor is abnormal, thus ensuring the necessary engine control.

Further, the constitution may be such that, in addition to the crank angle sensor, there is provided an intake valve timing control device that varies the intake valve timing by changing the rotation phase of an intake-side camshaft with respect to the crankshaft, and when the crank angle sensor is diagnosed to be abnormal, the rotation phase of the intake-side camshaft with respect to the crankshaft is controlled to the most delayed rotation phase.

According to this constitution, when the crank angle sensor is abnormal, the rotation phase of the intake-side camshaft with respect to the crankshaft is controlled to the most delayed rotation phase, to thereby prevent the problems caused when the intake valve timing is controlled toward the advanced angle, such as, the occurrence of knocking during idling state. Moreover, since the rotation phase of the intake-side camshaft with respect to the crankshaft is fixed to a known phase, the reference crank angle position can be detected with high accuracy, enabling to improve the accuracy of a fail-safe control.

Moreover, the constitution may be such that, in addition to the crank angle sensor, there is provided an exhaust valve timing control device that varies the exhaust valve timing by changing the rotation phase of an exhaust-side camshaft with respect to the crankshaft, and when the crank angle sensor is diagnosed to be abnormal, the rotation phase of the exhaust-side camshaft with respect to the crankshaft is controlled to the most advanced rotation phase.

According to this constitution, since the rotation phase of the exhaust-side camshaft with respect to the crankshaft is controlled to the most advanced rotation phase when the crank angle sensor is abnormal, the problems caused by the exhaust valve timing being controlled toward the delayed angle, such as, knocking caused during idling condition, can be prevented. Moreover, since the rotation phase of the exhaust-side camshaft with respect to the crankshaft is fixed to a known phase, the reference crank angle position can be detected with high accuracy, enabling to improve the accuracy of the failsafe control.

Even further, the cam sensors can each be mounted respectively to each bank in a V-type engine, or they can each be mounted respectively to each camshaft in an engine equipped with an intake-side camshaft and an exhaust-side camshaft.

According to these constitutions, the cylinder discrimination is performed based on the combination of the number of cylinder discrimination signals being output from a cam sensor mounted to one camshaft between reference crank angle positions and the number of cylinder discrimination signals being output from another cam sensor mounted to the other camshaft between reference crank angle positions. In this way, since two cam sensors are mounted to different camshafts, the length size of the camshaft can be designed smaller compared to when two cam sensors are mounted to one camshaft.

The other objects and features of the present invention will become understood from the following description with the accompanying drawings.

BRIEF EXPLANATION OF THE DRAWINGS

FIGS. 9A and 9B shows a cylinder discrimination pattern during backup control of the above-mentioned embodiment;

FIG. 13 is a diagram showing a cylinder discrimination pattern during backup control of the second embodiment;

DETAILED DESCRIPTION OF THE PREFERRED EMBODIMENT

Embodiments of the present invention will now be explained with reference to the drawings.

Figure 1:
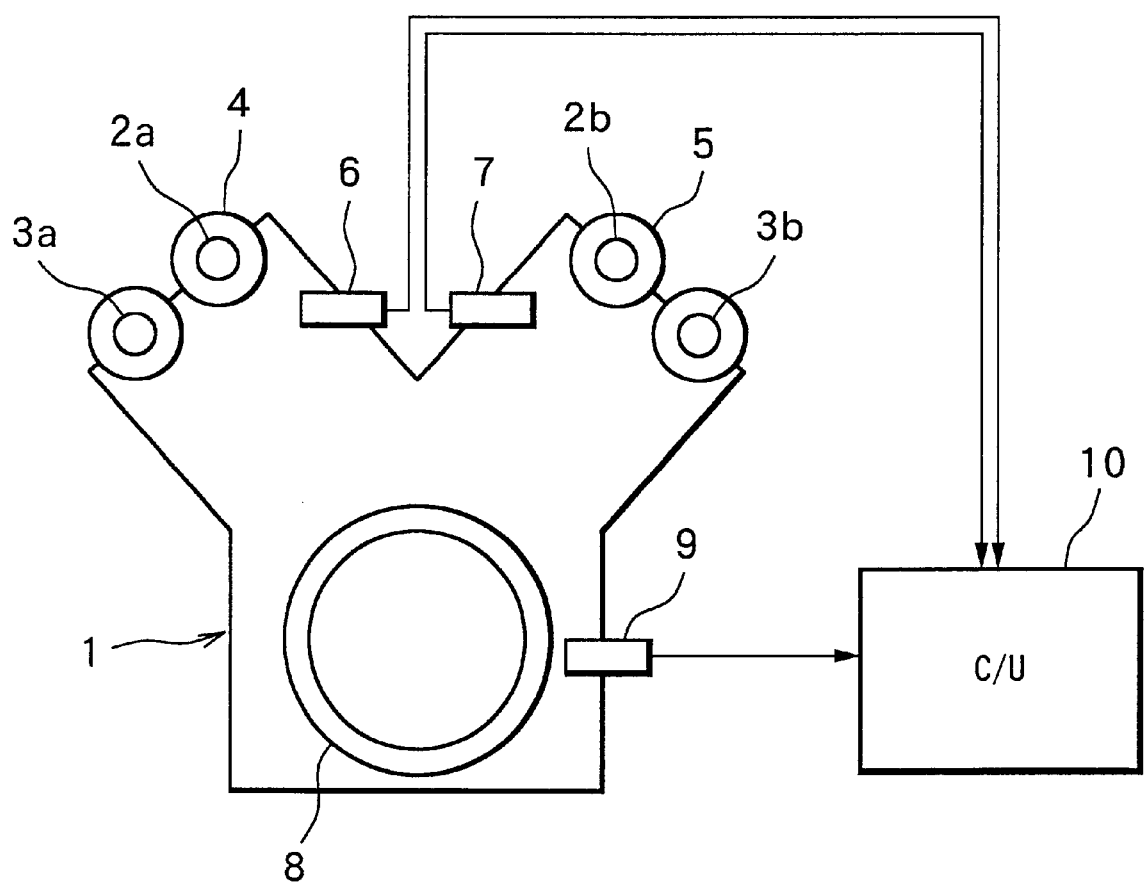
FIG. 1 is a diagram showing a system structure of a V-type 6 cylinder engine according to a first embodiment of the present invention.

An engine shown in FIG. 1 is a 6-cylinder V-type engine, and each bank is equipped with intake-side camshafts 2a and 2b, and exhaust-side camshafts 3a and 3b.

Signal plates 4 and 5 are axially supported, respectively, by each of the intake-side camshafts 2a and 2b equipped to each bank, and magnet-type first cam sensor 6 and second cam sensor 7 are provided for detecting the protruded portion (not shown) formed to each of the signal plates 4 and 5 to output cylinder discrimination signals Phase1 and Phase2.

The first and second cam sensors 6 and 7 may be provided to each of the exhaust-side camshafts 3a and 3b of each bank, or the first and second cam sensors 6 and 7 may be provided to the intake-side camshaft 2a and the exhaust-side camshaft 3a at the one bank.

Furthermore, the engine is equipped with a magnet-type crank angle sensor 9 that outputs position signals POS for every unit angle by detecting the protruded portion (not shown) formed to a signal plate 8 mounted to a crank pulley.

Detection signals from the first cam sensor 6, the second cam sensor 7 and the crank angle sensor 9 are input to a control unit 10, and the control unit 10 having cylinder discrimination function performs cylinder discrimination based on the detection signals, and controls the fuel injection or ignition in the engine based on the result of the cylinder discrimination. Moreover, the control unit 10 is equipped with an intake valve timing control device and an exhaust valve timing control device that vary the valve timing while maintaining a fixed operation angle by changing the rotation phase of the intake-side camshaft or the exhaust-side camshaft with respect to a crankshaft, and detects the rotation phase of the intake-side camshaft based on the detection signals to feedback control the rotation phase. Further, the rotation phase of the exhaust-side camshaft is detected based on a detection signal output by another sensor not shown in the figure.

Figure 2:
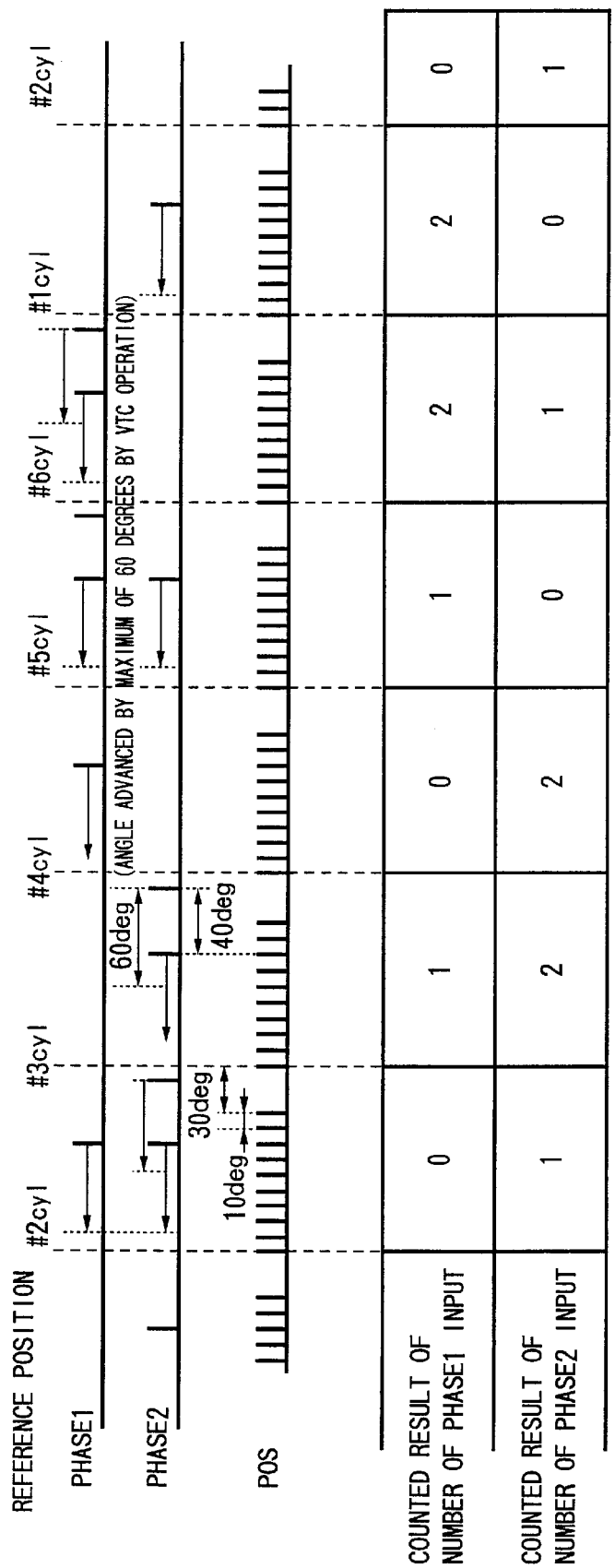
FIG. 2 is a time chart showing output characteristics of a detection signal in the V-type 6 cylinder engine.

FIG. 2 shows output characteristics of the first cam sensor 6, the second cam sensor 7 and the crank angle sensor 9 in the above-mentioned 6-cylinder V-type engine. The position signal POS is constructed to be dropped out at every 120° CA equivalent to a stroke phase difference between cylinders. By detecting a drop out position, a reference crank angle position is detected.

On the other hand, the cylinder discrimination signal Phase1 is output for the following number of times: 0 times between reference crank angle positions #1 and #2; 1 time between reference crank angle positions #2 and #3; 0 times between reference crank angle positions #3 and #4; 1 time between reference crank angle positions #4 an #5; 2 times between reference crank angle positions #5 and #6; and 2 times between reference crank angle positions #6 and #1.

Moreover, the cylinder discrimination signal Phase2 is output for the following number of times: 1 time between reference crank angle positions #1 and #2; 2 times between reference crank angle positions #2 and #3; 2 times between reference crank angle positions #3 and #4; 0 times between reference crank angle positions #4 and #5; 1 time between reference crank angle positions #5 and #6; and 0 times between crank angle positions #6 and #1.

Figures 3, 4:
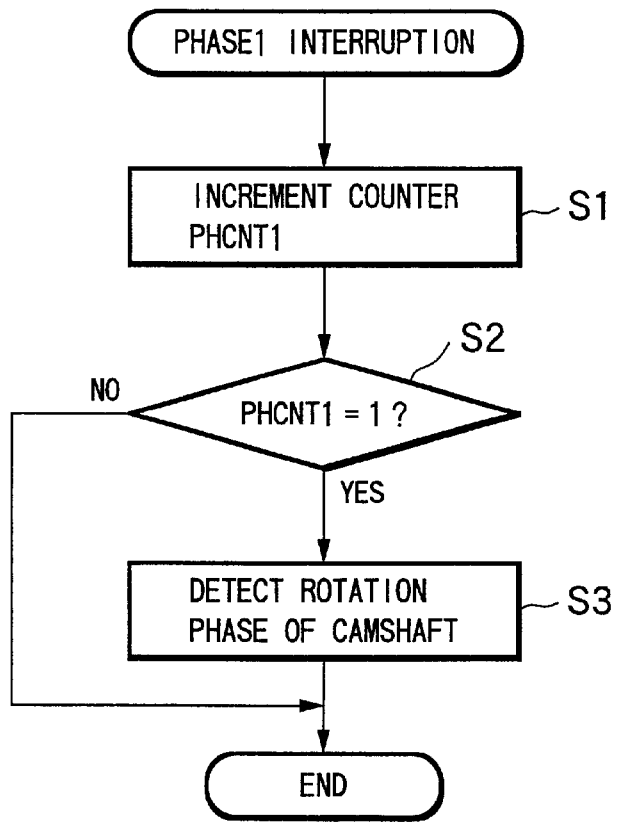
FIG. 3 shows a cylinder discrimination pattern according to the output characteristics of FIG. 2.
FIG. 4 is a flowchart showing counting process of cylinder discrimination signal Phase1 between reference crank angle positions according to the above-mentioned embodiment.

Therefore, the combinations of the output number of cylinder discrimination signals Phase1 and Phase2 constitute 6 patterns as shown in FIG. 3, and by determining which of the combinations corresponds to, the six cylinders can each be discriminated.

Next, a cylinder discrimination control performed based on the combination of the number of output of cylinder discrimination signals Phase1 and Phase2 between the reference crank angle positions is explained in detail with reference to flowcharts.

A control of flowchart of FIG. 4 is interruptingly executed whenever the cylinder discrimination signal Phase1 is output. In step S1, a counter PHCNT1 for counting the number of output of cylinder discrimination signals Phase1 is incremented.

In next step S2, it is judged whether or not the signal is a leading cylinder discrimination signal Phase1 output after the reference crank angle position, by judging whether or not the counter PHCNT1 is 1.

When the counter PHCNT1 is 1, the control advances to step S3 where based on the angle from the directly previous reference crank angle position to the leading cylinder discrimination signal Phase1, the rotation phase of the intake-side camshaft (intake valve timing) is detected.

Figure 5:
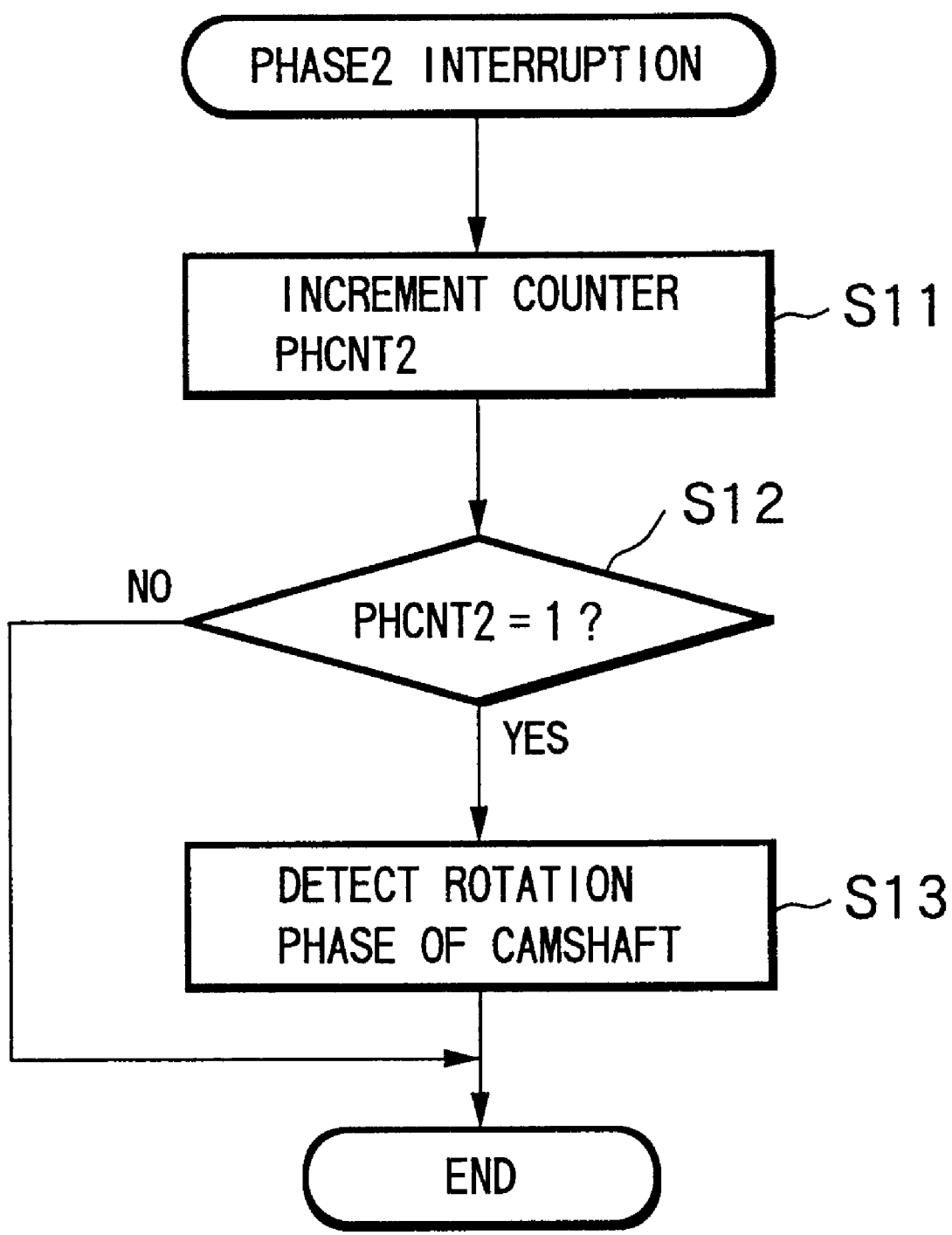
FIG. 5 is a flowchart showing a counting process of cylinder discrimination signal Phase2 between reference crank angle positions according to the above-mentioned embodiment.

A control of flowchart of FIG. 5 is interruptingly executed whenever the cylinder discrimination signal Phase2 is output. Similar to FIG. 4, in step S11, a counter PHCNT2 for counting the number of output of cylinder discrimination signals Phase2 is incremented (counting means), then in next step S12, it is judged whether or not the counter PHCNT2 is 1. When the counter PHCNT2 is 1, the procedure advances to step S13 where based on the angle from the directly previous reference crank angle position to a leading cylinder discrimination signal Phase2, the rotation phase of the intake-side camshaft (intake valve timing) is detected.

Figure 6:
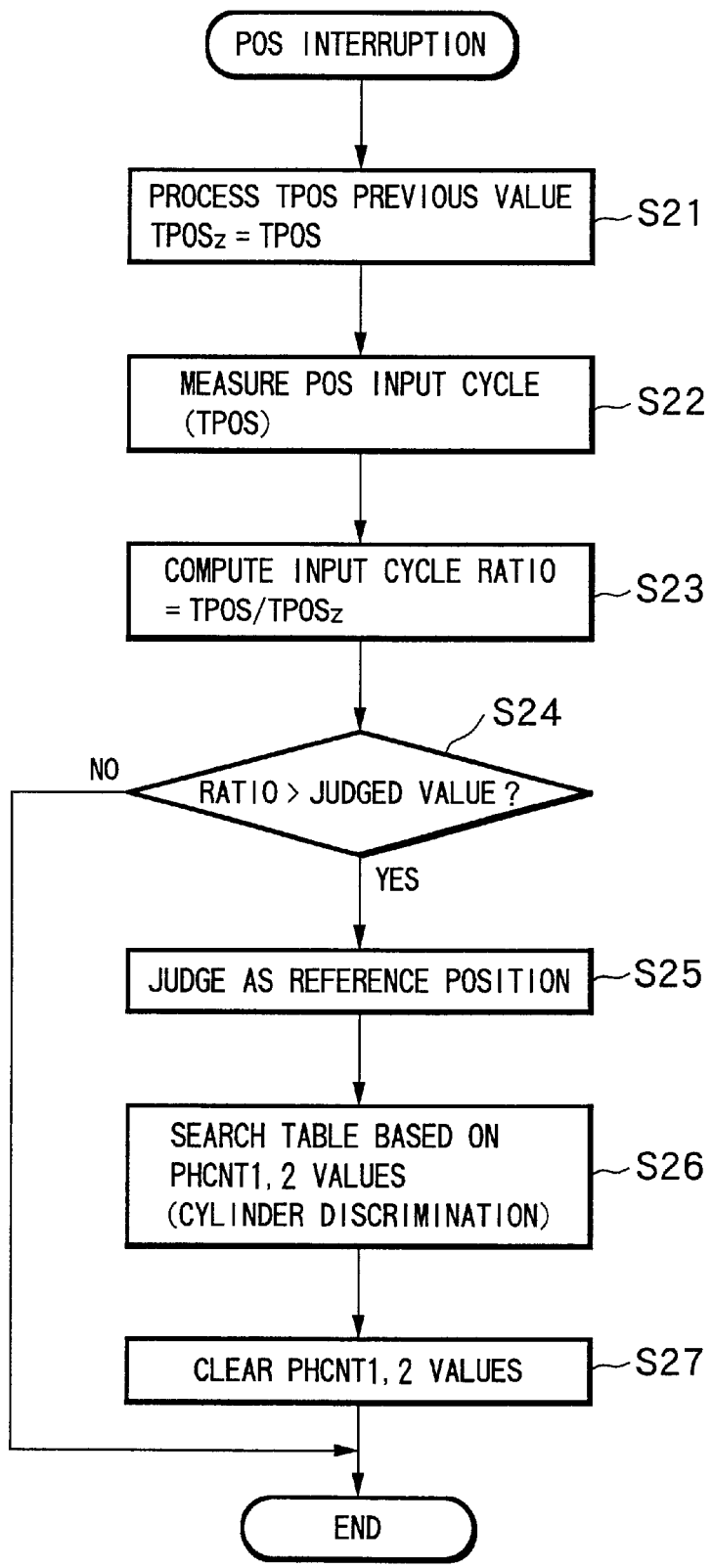
FIG. 6 is a flowchart showing cylinder discrimination process based on the count values of cylinder discrimination signals Phase1 and Phase2 according to the above-mentioned embodiment.

A control of flowchart of FIG. 6 is interruptingly executed whenever the position signal POS is output. In step S21, an output cycle TPOS of the position signal POS is set to the previous value TPOSz, and in next step S22, the newest cycle TPOS is obtained.

In step S23, a cycle ratio=TPOS/TPOSz is computed, and in step S24, it is judged whether or not the cycle ratio exceeds a judgment level, so as to discriminate whether or not it is the drop out position.

If the cycle ratio is equal to or below the judgment level, the preset routine is terminated. However, if the cycle ratio is judged to exceed the judgment level, the procedure advances to step S25 where the judgment of the reference crank angle position is performed.

In step S26, based on the counters PHCNT1 and PHCNT2 counting the number of output of the cylinder discrimination signals Phase1 and Phase2, by referring to a table as shown in FIG. 3, cylinder discrimination (discrimination of the cylinder corresponding to the current reference crank angle position) is performed.

In step S27, the counters PHCNT1 and PHCT2 are cleared so that the number of output of cylinder discrimination signals Phase1 and Phase2 between the next reference crank angle positions can be counted.

Next, a backup control according to the present invention when the crank angle sensor is malfunctioning is explained.

Figure 7:
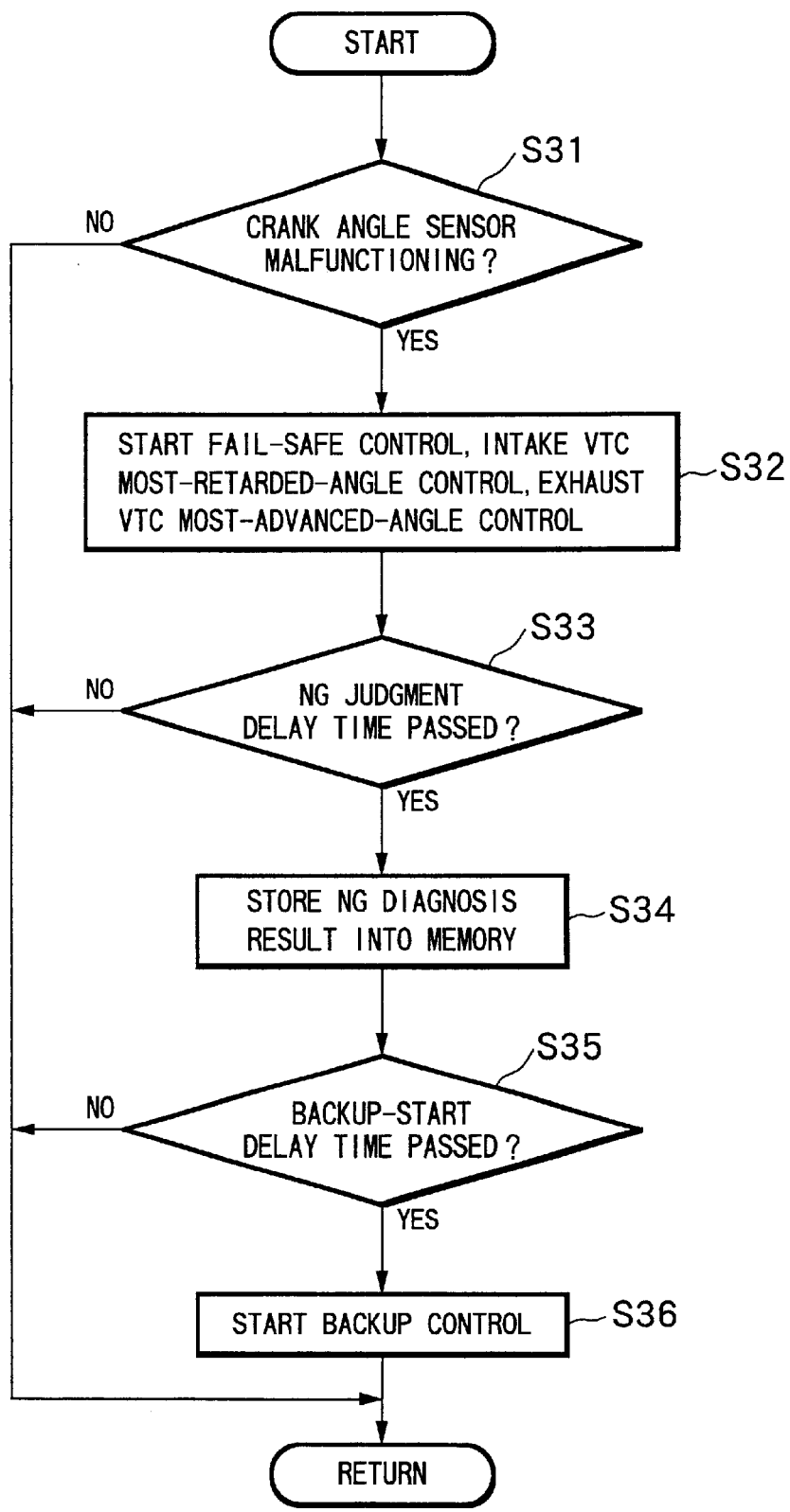
FIG. 7 is a flowchart showing fault diagnosis of a crank angle sensor to the starting of backup control.

FIG. 7 is a flowchart showing a routine from fault diagnosis of the crank angle sensor to the starting of the backup control during failure.

In step S31, it is judged whether or not the crank angle sensor 9 is malfunctioning (disconnection), based on whether or not a state has continued for a predetermined time where the cylinder discrimination signals Phase1 and Phase2 are input but the position signal POS is not input.

When it is judged that the above state has continued for the predetermined time, it is diagnosed in step S32 that the crank angle sensor is malfunctioning, and a fail-safe control such as fuel cut and ignition cessation is started. At the same time, a control is started such that, by the intake/exhaust valve timing control device, the intake-side camshafts 2a and 2b are rotated relatively to a crank angle position that is the most delayed angle position with respect to the crankshaft by the intake/exhaust valve timing control device, and the exhaust-side camshafts 3a and 3b are rotated relatively to a crank angle position that is the most advanced angle position with respect to the crankshaft.

After the fault diagnosis, the elapse of a predetermined NG judgment delay time is further waited for in step S33, and in step 34, an NG diagnosis result is stored. Specifically, for example, a mill lamp is turned on.

In step S35, the elapse of a predetermined backup start delay time is further waited for before starting the backup control according to the present invention, and in step S36, the backup control is started. That is, problems such as knocking during idling state may occur if the backup control is started while the intake-side camshaft is advanced or the exhaust-side camshaft is delayed, so the backup control is started after the intake/exhaust valve timing control has completely ended.

The backup control will now be explained in detail.

The output characteristics of the cylinder discrimination signals Phase1 and Phase2 are set as follows: during the longest interval between the cylinder discrimination signal Phase1 between reference crank angle positions #2 and #3 and the cylinder discrimination signal Phase1 output between reference crank angle positions #4 and #5, output from the first cam sensor 6, three or more cylinder discrimination signals Phase2 are output from the second cam sensor 7 (the number of output being either 3 or 4 due to a transient phase deviation during the rotation phase control between the camshafts), and during the output interval of other cylinder discrimination signals Phase1, less than three cylinder discrimination signals Phase2 are set to be output. Similarly, during the longest interval between the cylinder discrimination signal Phase2 between reference crank angle positions #5 and #6 and the cylinder discrimination signal Phase2 output between reference crank angle positions #1 and #2, output from the second cam sensor 7, three or more cylinder discrimination signals Phase1 are output from the first cam sensor 6, and during the output interval of other cylinder discrimination signals Phase2, less than three cylinder discrimination signals Phase1 are set to be output (refer to FIG. 2).

Figure 8:
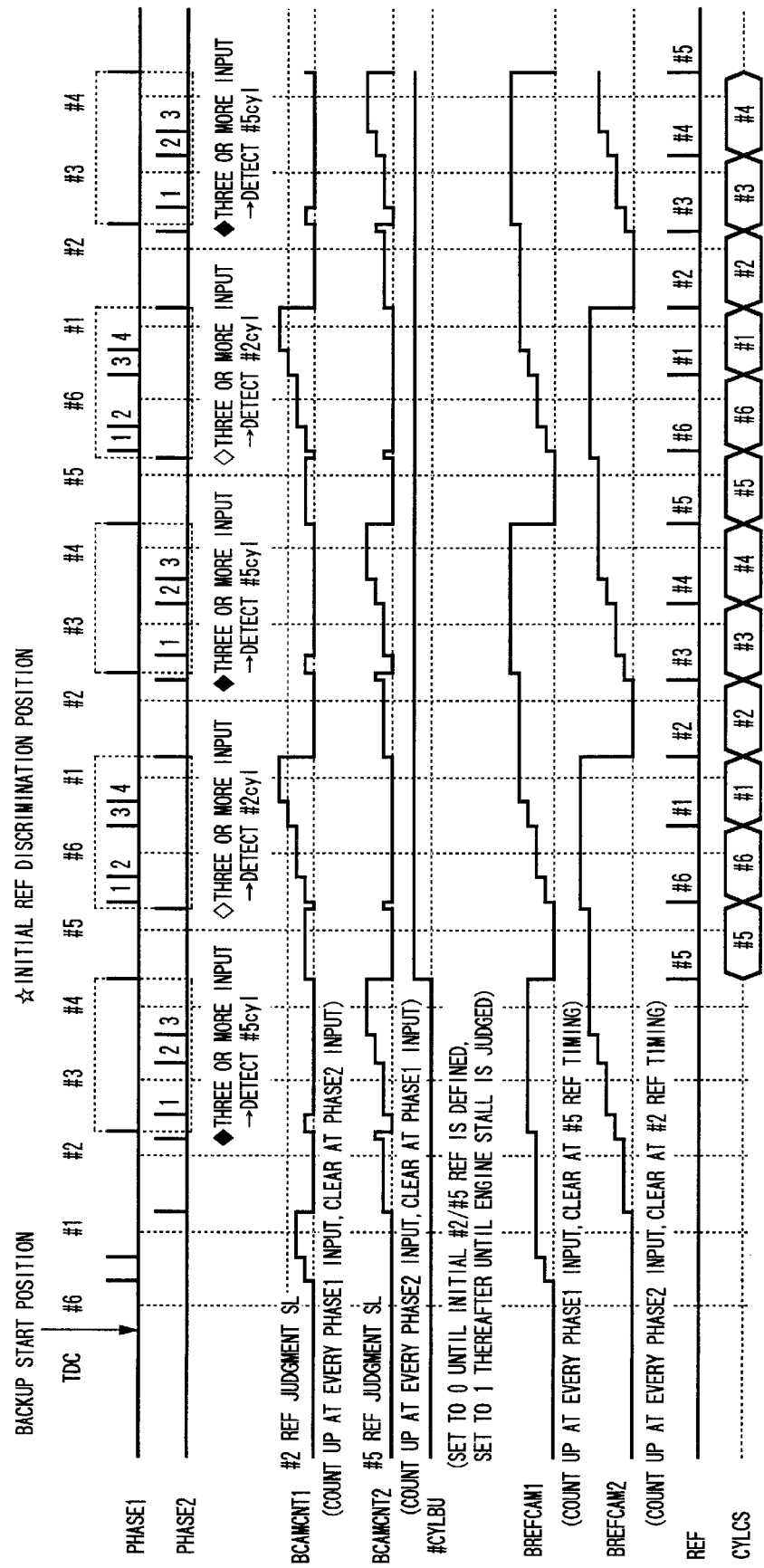
FIG. 8 is a time chart showing the details of the backup control according to the above-mentioned embodiment.

Based on the above characteristics, the backup control is carried out as shown in the time chart of FIG. 8.

There is provided a counter BCAMCNT1 that is counted up for every output of the cylinder discrimination signal Phase1 output from the first cam sensor 6 and is cleared by the output of the cylinder discrimination signal Phase2 from the second cam sensor 7, and a counter BCAMCNT2 that is counted up for every output of the cylinder discrimination signal Phase2 output from the second cam sensor 7 and is cleared by the output of the cylinder discrimination signal Phase1 from the first cam sensor 6. In other words, the counter BCAMCNT1 has a function for counting the number of output of the cylinder discrimination signals Phase1 during the interval of output of cylinder discrimination signals Phase2, and the counter BCAMCNT2 has a function for counting the number of output of the cylinder discrimination signals Phase2 during the interval of output of cylinder discrimination signals Phase1. When the counted value of counter BCAMCNT2 equals or exceeds 3, the terminating time of that output interval, in other words, the time when the cylinder discrimination signal Phase1 output between reference crank angle positions #4 and #5 is output is detected as the reference crank angle position of cylinder #5. Similarly, when the counted value of counter BCAMCNT1 equals or exceeds 3, the terminating time of that output interval, in other words, the time when the cylinder discrimination signal Phase2 output between reference crank angle positions #1 and #2 is output is detected as the reference crank angle position of cylinder #2 (refer to FIG. 9(A)).

Further, after discriminating either one of the above-mentioned two specific cylinders (cylinder #5 and cylinder #2), the cylinders other than these specific cylinders are discriminated as follows. That is, there is provided a counter BREFCAM1 that is counted up for every output of the cylinder discrimination signal Phase1 and is cleared at the timing when cylinder #5 is detected, and a counter BREFCAM2 that is counted up for every output of the cylinder discrimination signal Phase2 and is cleared at the timing when cylinder #2 is detected, and based on the counted value of either the counter BREFCAM1 or counter BREFCAM2, cylinder discrimination is performed. Specifically, cylinder #6 is discriminated when the counted value of counter BREFCAM1 becomes 1 after detecting cylinder #5, and cylinder #1 is discriminated when the counted value reaches 3. Further, cylinder #3 is discriminated when the counted value of counter BREFCAM2 becomes 1 after detecting cylinder #2, and cylinder #4 is discriminated when the value reaches 3 (refer to FIG. 9(B)).

Next, the above-mentioned backup control will be explained in detail with reference to a flowchart.

Figure 10:
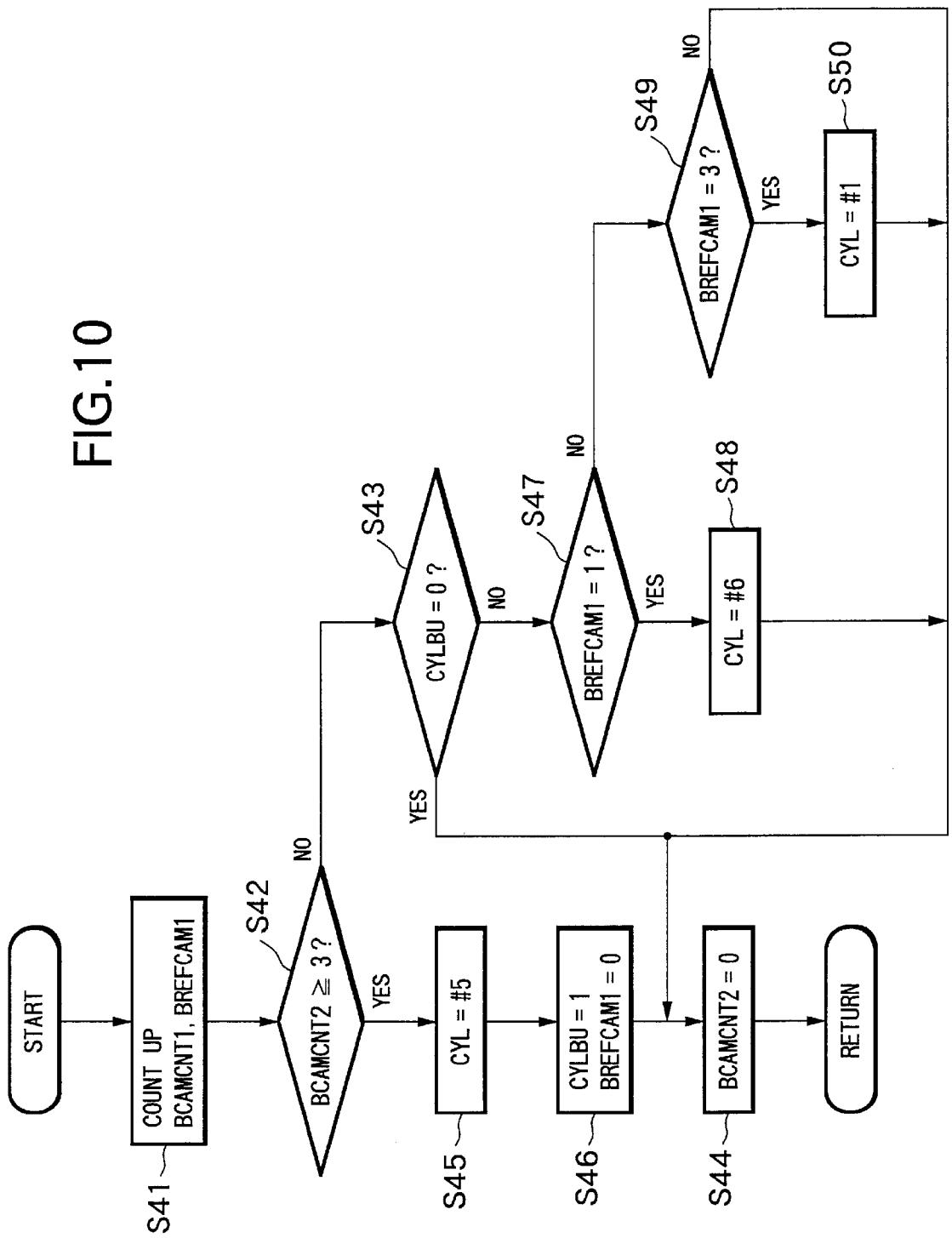
FIG. 10 is a flowchart showing counting process by interruption of one cylinder discrimination signal Phase1 during the backup control.

The flowchart of FIG. 10 is an interruption routine performed whenever the cylinder discrimination signal Phase1 is output after starting the backup control, wherein in step S41, counter BCAMCNT1 and counter BCAMCNT2 are each counted up.

In step S42, it judged whether or not the counted value of counter BCAMCNT2 is three or greater.

If the counted value is less than three, the procedure advances to step S43 where it is judged whether or not the initial judgment flag CYLBU is 0 (the initial value when starting the backup control is 0).

If the flag CYLBU is 0, it means that the initial discrimination of either one of the specific cylinders is not completed yet, and therefore the discrimination of other cylinders cannot be performed, so the procedure advances to step S44 where the counter BCAMCNT2 is reset and then the present flow is terminated.

When it is judged in step S42 that the counted value of the counter BCAMCNT2 is three or greater, the procedure advances to step S45 where the cylinder is discriminated as cylinder #5. The time of this discrimination is set as the reference crank angle position of cylinder #5, and based thereon the ignition timing control or the fuel injection control is performed (the same for all following steps).

Then, in step S46, the initial judgment flag CYLBU is set to 1 and the counter BREFCAM1 is reset, then, in step S44, the counter BCAMCNT2 is reset and the present flow is terminated.

After the discrimination of cylinder #5 is performed as above (or the discrimination of cylinder #2 is performed in advance as explained in the following) and the initial judgment flag CYLBU is set to 1, the procedure advances to step S47 where it is judged whether or not the counted value of the counter BCAMCNT1 is 1. When the counted value is 1, discrimination is performed in step S48 that the cylinder is cylinder #6. Further, when the counted value of the counter BCAMCNT1 is not 1, it is judged in step S49 whether or not the counted value is 3, and when it is 3, discrimination is performed in step S50 that the cylinder is cylinder #1. After these cylinder discriminations, the procedure advances to step S44 before the present flow is terminated.

Further, when the counted value of the counter BCAMCNT1 is judged to be other than 1 or 3, the procedure advances to step S44 before the present flow is terminated.

Figure 11:
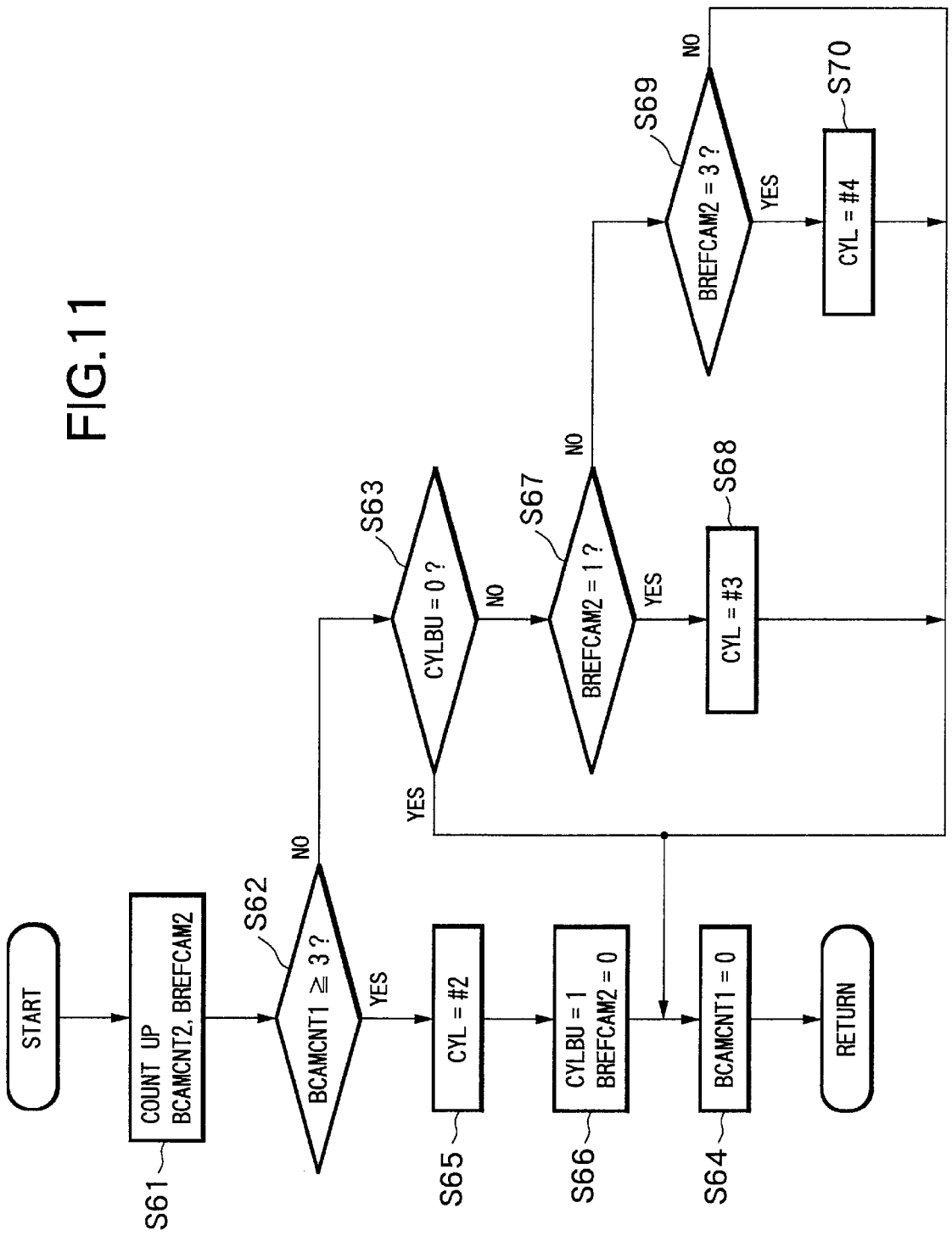
FIG. 11 is a flowchart showing counting process by interruption of another cylinder discrimination signal Phase2 during the backup control.

On the other hand, the flowchart of FIG. 11 is interruptingly executed whenever the cylinder discrimination signal Phase2 is output after the backup control has been started, wherein similar to FIG. 10, cylinder #2 is discriminated when the counted value of the counter BCAMCNT2 is 3 or more, and thereafter, when the counted value of the counter BCAMCNT2 is 1 (or 3), cylinder #3, cylinder #4 are sequentially discriminated.

Next, a second embodiment of the present invention will be explained. An engine system to be applied, the control when the crank angle sensor is functioning normally, and the control from the fault diagnosis until the backup control is started, are the same as those of the first embodiment. In other words, FIGS. 1 through 7 are common to the first and second embodiments, and only the backup control of the second embodiment differs from that of the first embodiment.

The backup control according to the second embodiment will now be explained.

The output characteristics of the cylinder discrimination signals Phase1 and Phase2 output similarly as in the first embodiment are set as follows: the interval between the cylinder discrimination signal Phase2 output between reference crank angle positions #1 and #2 from the second cam sensor 7 and the cylinder discrimination signal Phase1 output between reference crank angle positions #2 and #3 from the first cam sensor 6 is set as the longest crank angle interval, and the interval until the cylinder discrimination signal Phase2 output from the second cam sensor 7 immediately thereafter is set as the shortest crank angle interval. Similarly, the interval between the cylinder discrimination signal Phase1 output between reference crank angle positions #4 and #5 from the first cam sensor 6 and the cylinder discrimination signal Phase2 output between reference crank angle positions #5 and #6 from the second cam sensor 7 is set as the longest crank angle interval, and the interval until the cylinder discrimination signal Phase1 output from the first cam sensor 6 immediately thereafter is set as the shortest crank angle interval (refer to FIG. 2).

Figure 12:
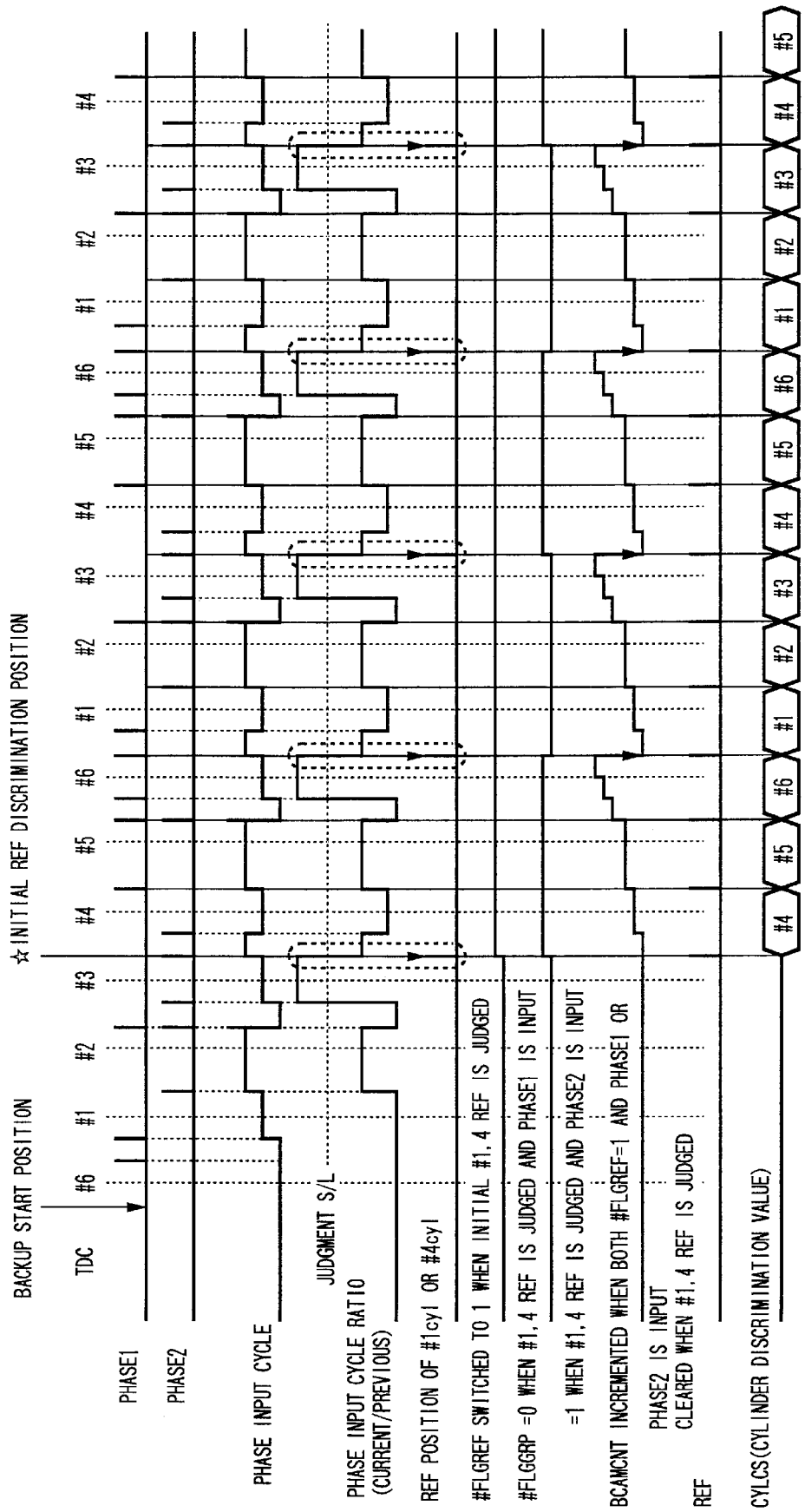
FIG. 12 is a time chart showing the details of backup control according to a second embodiment of the present invention.

Based on these characteristics, the backup control is performed as shown in a time chart of FIG. 12.

In FIG. 12, the Phase input cycle is the cycle of signal input intervals measured whenever the cylinder discrimination signal Phase1 from the first cam sensor 6 or the cylinder discrimination signal Phase2 from the second cam sensor 7 is input.

The Phase input cycle ratio is a ratio between the most newly measured value and the previously measured value of the Phase input cycle (newest value/last value).

The point of time when the Phase input cycle ratio is judged to exceed the judgment slice level S/L (threshold value) (when the next cylinder discrimination signal Phase is input after exceeding the slice level) is set as a reference position REF of either cylinder #1 or cylinder #4 (specific cylinder).

The flag FLGREF is switched from 0 to 1 (the flag is reset to 0 before starting the backup control) when it is initially discriminated that the cylinder is #1 or #4.

The flag FLGGRP is switched to 0 when the cylinder is discriminated to be either specific cylinder #1 or specific cylinder #4, and at this time the cylinder discrimination signal Phase1 is being input. Similarly, when the cylinder discrimination signal Phase2 is being input when a specific cylinder is discriminated, the flag is switched to 1.

That is, it is initially discriminated that the cylinder is one of the either specific cylinders #1 or #4 when the flag FLGREF is switched to 1, and if the flag FLGGRP is 0 at this time, the initial specific cylinder is discriminated as cylinder #1, and if the flag FLGGRP is 1, the initial specific cylinder is discriminated as cylinder #4. Thereafter, whenever the value of the flag FLGGRP is switched, the specific cylinder is discriminated as either #1 or #4. In other words, the specific cylinder is discriminated based on the Phase input cycle ratio and the discrimination of the cam sensor from which the newest cylinder discrimination signal has been output.

Moreover, the counter BCAMCNT is incremented whenever the cylinder discrimination signal Phase1 or the cylinder discrimination signal Phase2 is input after the flag FLGREF has been switched to 1, and cleared each time the specific cylinder (#1 or #4) is discriminated.

After discriminating the specific cylinder #1 or #4, based on the discriminated result and the counted value of the counter BCAMCNT, the cylinders other than the specific cylinders #1 and #4 (#2, #3, #5, #6) are discriminated. Specifically, after the flag FLGGRP becomes 0 and cylinder #1 is discriminated, cylinder #2 is discriminated when the counter BCAMCNT becomes 2, and cylinder #3 is discriminated when the counter BCAMCNT becomes 4. Next, after discriminating cylinder #4 when the flag FLGGRP is switched to 1, cylinder #5 is discriminated when the counter BCAMCNT becomes 2, and cylinder #6 is discriminated when the counter BCAMCNT becomes 4 (refer to FIG. 13).

Next, the above-mentioned backup control will be explained in detail with reference to the flowcharts.

Figure 14:
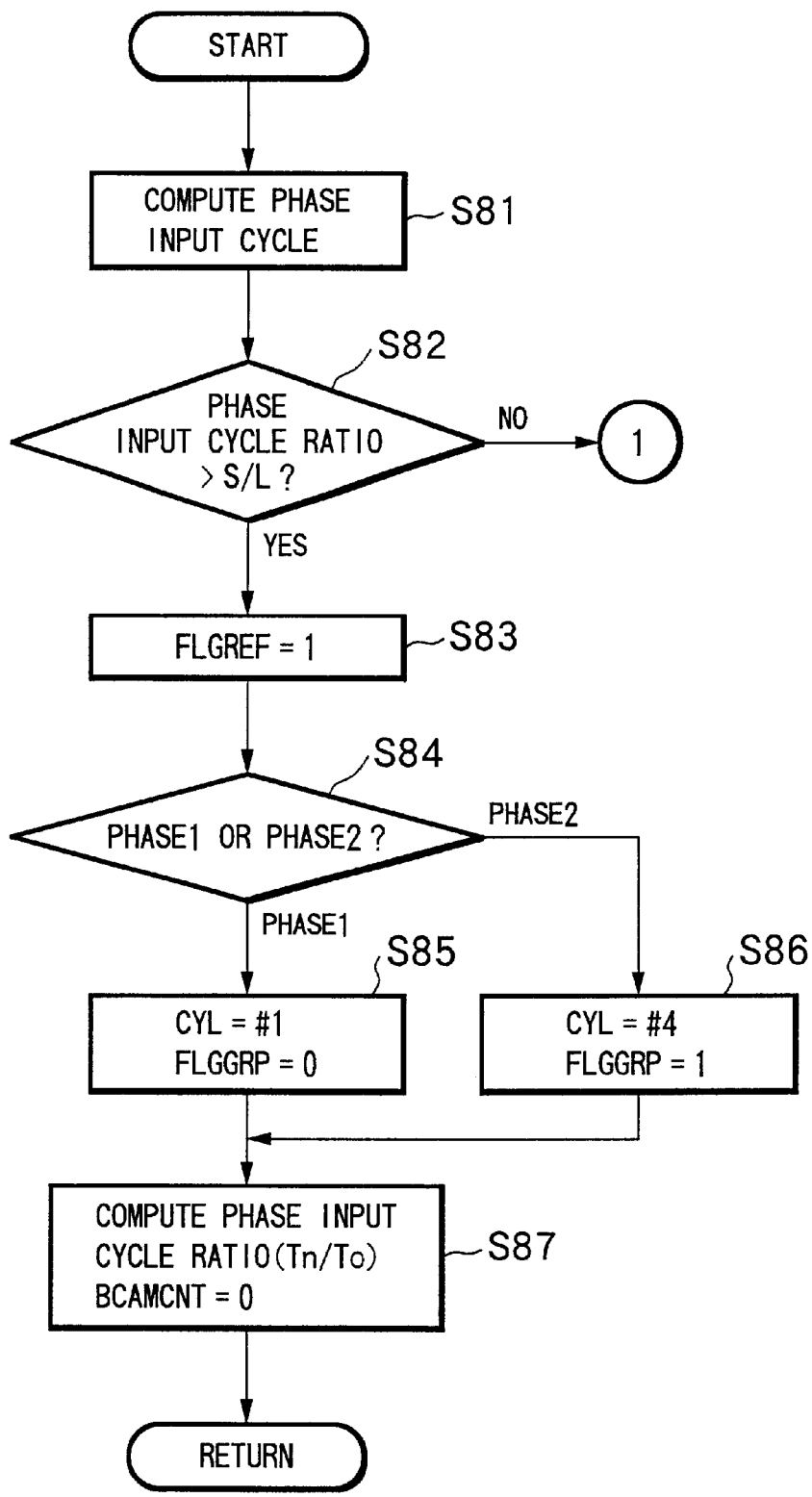
FIG. 14 is a flowchart showing the former steps of counting process by interruption of the cylinder discrimination signal during the backup control.
Figure 15:
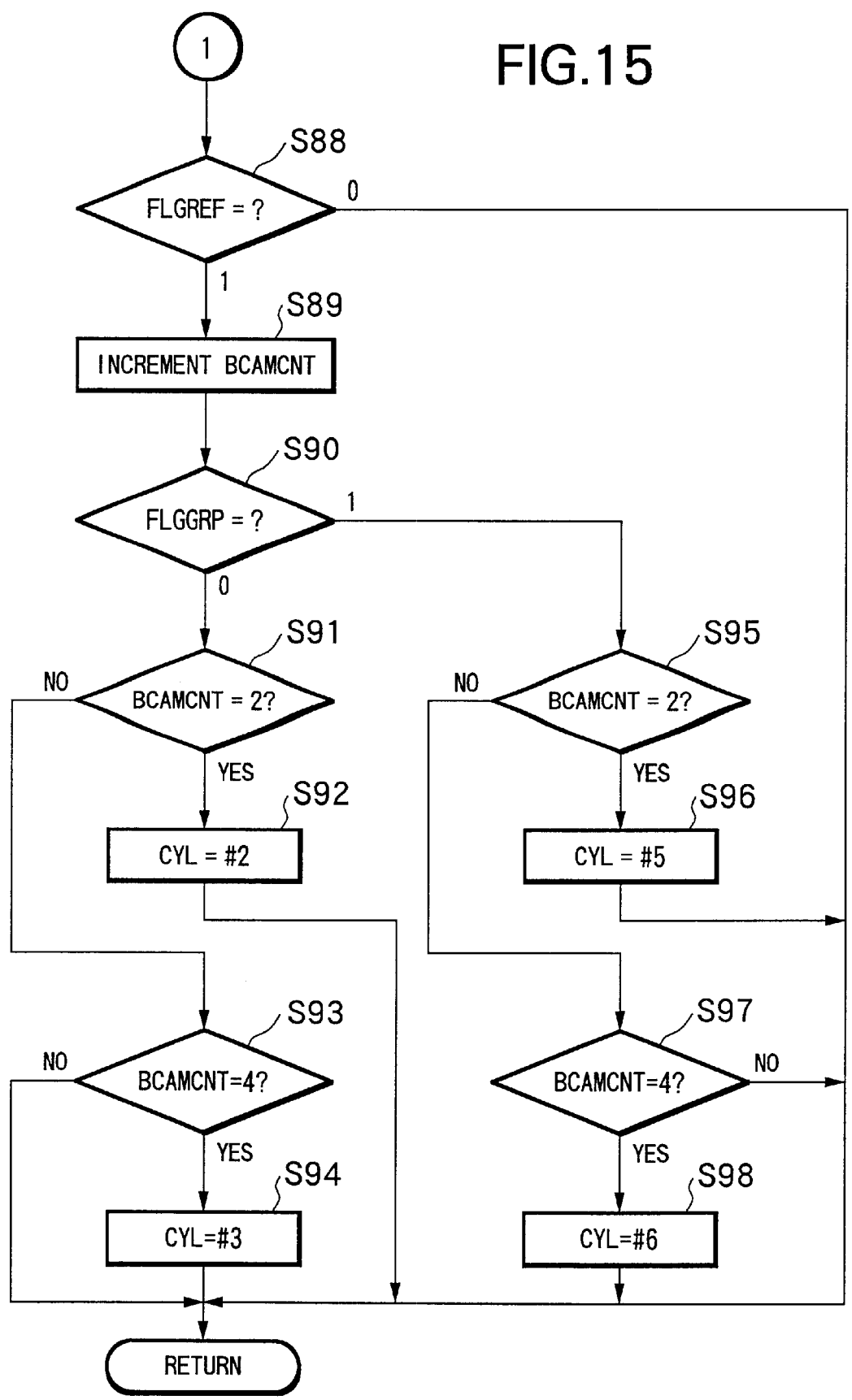
FIG. 15 is a flowchart showing the latter half of the counting process by interruption of the cylinder discrimination signal during the backup control.

The flowcharts of FIG. 14 and FIG. 15 are interruptingly executed whenever the cylinder discrimination signal Phase1 or Phase2 is output after the backup control has been started. In step S81, the abovementioned Phase input cycle is computed.

In step S82, it is judged whether or not the Phase input cycle ratio currently stored (newest value/last value of Phase input cycle) exceeds a judgment slice level S/L.

When it is judged in step S82 to exceed the judgment slice level S/L, the procedure advances to step S83, and the flag FLGREF is set to 1.

In step S84, it is judged whether the currently input cylinder discrimination signal is Phase1 or Phase2.

If the signal is judged to be Phase1, the procedure advances to step S85 where the cylinder is discriminated as cylinder #1 (the time of discrimination is set as the reference position of cylinder #1, and the same for all following steps), and the flag FLGGRP is set to 0. If the signal is judged to be Phase2, the procedure advances to step S86 where the cylinder is discriminated as cylinder #4, and the flag FLGGRP is set to 1.

Next, in step S87, the Phase input cycle ratio (Tn/To) is computed based on the current Phase input cycle Tn and the previous Phase input cycle To computed in step S81, which is then stored for use in the following step S82, and at the same time, the counter BCAMCNT is cleared to 0.

On the other hand, when it is judged in step S82 that the Phase input cycle ratio does not exceed the judgment slice level, the procedure advances to step S88 where the value of flag FLGREF is discriminated. If the flag FLGREF is 0, in other words, when the initial specific cylinder has not yet been discriminated, the present flow is terminated and the input of a new cylinder discrimination signal is waited for.

When the flag FLGREF is 1, that is, after the initial specific cylinder has been discriminated, the procedure advances to step S89 where the counter BCAMCNT is incremented and then the procedure advances to step S90 where the value of the flag FLGGRP is discriminated.

When the flag FLGGRP is 0, in other words, when the currently discriminated cylinder is cylinder #1, it is judged in step S91 whether or not the counted value of the counter BCAMCNT is 2, and if the value is 2, the procedure advances to step S92 where the cylinder is discriminated as cylinder #2. Further, if the counted value of the counter BCAMCNT is not 2, the procedure advances to step S93 where it is judged whether or not the counted value is 4. When the value is 4, the procedure advances to step S94 where the cylinder is discriminated as cylinder #3. After the above-mentioned cylinder discrimination, the present flow is terminated. Moreover, if the counted value of counter BCAMCNT is other than 2 or 4, the present flow is terminated while maintaining the current cylinder discrimination result.

Moreover, when the flag FLGGRP is 1 in step S90, in other words, when the currently discriminated cylinder is cylinder #4, cylinder discrimination can similarly be performed. That is, during steps S95 through S98, while incrementing the counter BCAMCNT, the cylinder is discriminated as cylinder #5 or cylinder #6 when the counted value is 2 or 4, respectively, and if the value is other than those, the present flow is terminated while maintaining the current cylinder discrimination result.

The abovementioned first embodiment and the second embodiment have been explained as applied to a V-type engine, but the present invention can also be applied to an in-line engine.

Figure 16:
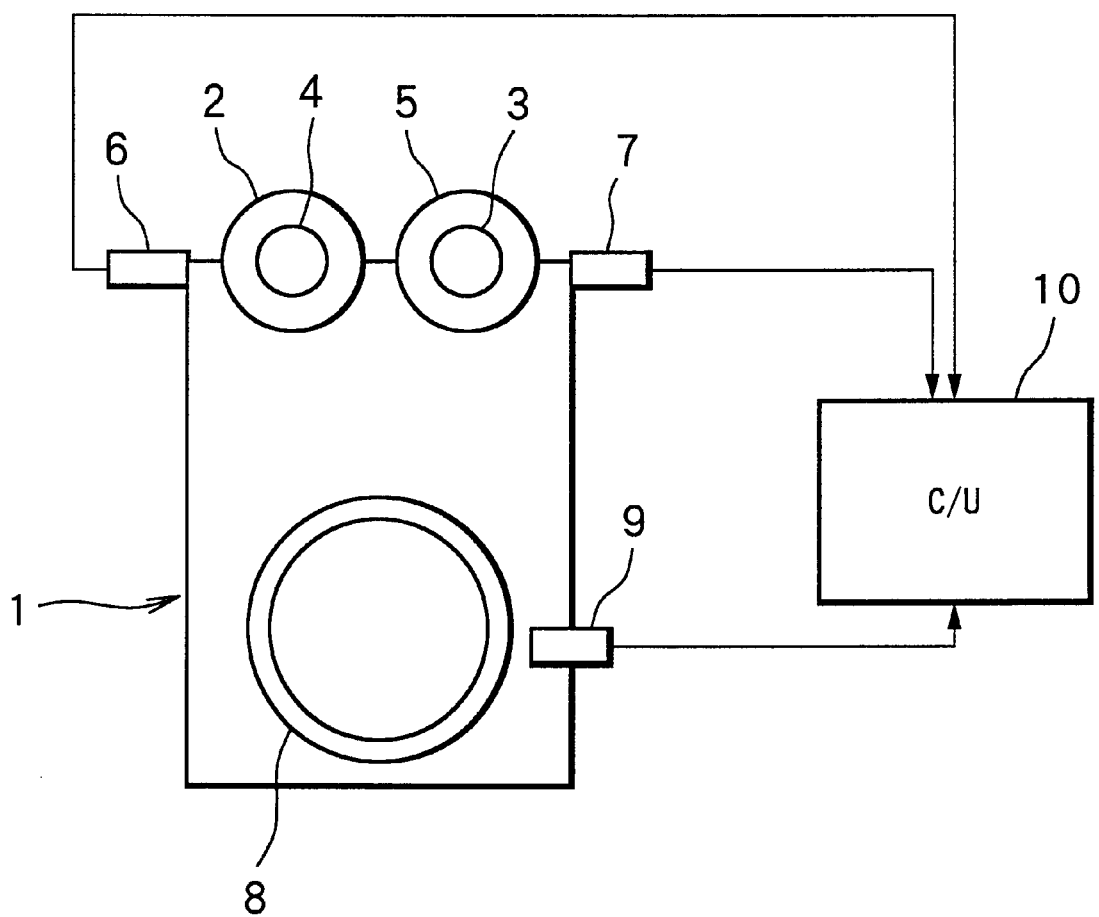
FIG. 16 is a diagram showing a system structure of an in-line 6-cylinder engine according to a third embodiment of the present invention.

FIG. 16 shows a third embodiment where the first cam sensor 6 and the second cam sensor 7 having the same functions as those explained in the preceding embodiments are mounted to the intake-side camshaft 2 and the exhaust-side camshaft 3 of an in-line 6-cylinder engine 1. The cylinder discrimination control is performed similarly as explained in the first and second embodiments.

According to the third embodiment, since two cam sensors are mounted to different camshafts, the size of the camshaft will not be increased in the length direction, and during malfunction of the crank angle sensor, the fail-safe control can be performed by discriminating cylinders based only on the signals output from said two cam sensors.

The entire contents of Japanese Patent Applications No. 2000-44553 filed Feb. 22, 2000 and No. 2000-44554 filed Feb. 22, 2000 are herein incorporated by reference.

What is claimed:

1. A cylinder discrimination device of an engine comprising:
   a plurality of cam sensors for outputting cylinder discrimination signals at every uneven crank angle interval;
   a first cylinder discrimination unit for uniquely discriminating a specific cylinder based on said cylinder discrimination signals output from said plurality of cam sensors; and
   a second cylinder discrimination unit for uniquely discriminating each of the cylinders other than said specific cylinder based on the discriminated result of said specific cylinder by said specific cylinder discrimination unit and said cylinder discrimination signals from said cam sensors.

2. A cylinder discrimination device of an engine according to claim 1, wherein said first cylinder discrimination unit uniquely discriminates a specific cylinder based on output characteristics of cylinder discrimination signals output from another cam sensor during a period of time from a previous output until a current output of cylinder discrimination signals from said respective cam sensors.

3. A cylinder discrimination device of an engine according to claim 2, wherein said first cylinder discrimination unit counts the number of output of cylinder discrimination signals from said another cam sensor during the period of time from the previous output and the current output of cylinder discrimination signals from said respective cam sensors, and uniquely discriminates the specific cylinder based on a difference in the number of said output.

4. A cylinder discrimination device of an engine according to claim 1, wherein said first cylinder discrimination unit measures the cycle of input of said cylinder discrimination signals while cylinder discrimination signals output from the respective cam sensors are sequentially input thereto, to discriminate the specific cylinder, based on a ratio of the most newly measured cycle and the previously measured cycle, and the discrimination of the cam sensor from which the newest cylinder discrimination signal has been output.

5. A cylinder discrimination device of an engine according to claim 4, wherein said first cylinder discrimination unit uniquely discriminates the specific cylinder when a value obtained by dividing said most newly measured cycle by said previously measured cycle exceeds a threshold value.

6. A cylinder discrimination device of an engine according to claim 1, wherein said second cylinder discrimination unit uniquely discriminates the cylinders other than the specific cylinder based on the number of output of cylinder discrimination signals from a cam sensor corresponding to the cylinder to be discriminated, immediately after the discrimination of the specific cylinder.

7. A cylinder discrimination device of an engine according to claim 1, wherein said second cylinder discrimination unit uniquely discriminates the cylinders other than the specific cylinder based on the total number of output of said cylinder discrimination signals from the respective cam sensors, immediately after the discrimination of the specific cylinder.

8. A cylinder discrimination device of an engine according to claim 1, further comprising:
a crank angle sensor for outputting a crank angle signal in synchronism with the rotation of a crankshaft, capable of detecting a reference crank angle position for every stroke phase difference between the cylinders;
a third cylinder discrimination unit for performing cylinder discrimination based on said detected reference crank angle position and the cylinder discrimination signals from said cam sensors;
a fault diagnosis unit for performing fault diagnosis of said crank angle sensor; and
a selecting unit for having said third cylinder discrimination unit to perform cylinder discrimination when said crank angle sensor is diagnosed as normal by said fault diagnosis unit, and having said first cylinder discrimination unit and said second cylinder discrimination unit to perform cylinder discrimination only when said crank angle sensor is diagnosed to be abnormal.

9. A cylinder discrimination device of an engine according to claim 8, further comprising:
an intake valve timing control device for varying an intake valve timing by changing a rotation phase of an intake-side camshaft with respect to the crankshaft; and
a most-delayed-angle control unit for controlling the rotation phase of said intake-side camshaft with respect to the crankshaft to the most delayed angle when said crank angle sensor is diagnosed to be abnormal by said fault diagnosis unit.

10. A cylinder discrimination device of an engine according to claim 8, further comprising:
an exhaust valve timing control device for varying an exhaust valve timing by changing a rotation phase of an exhaust-side camshaft with respect to the crankshaft; and
a most-advanced-angle control unit for controlling the rotation phase of said exhaust-side camshaft with respect to the crankshaft to the most advanced angle when said crank angle sensor is diagnosed to be abnormal by said fault diagnosis unit.

11. A cylinder discrimination device of an engine according to claim 1, wherein said cam sensors are mounted respectively to each bank in a V-type engine.

12. A cylinder discrimination device of an engine according to claim 1, wherein said cam sensors are mounted correspondingly to each camshaft in an engine equipped with an intake-side camshaft and an exhaust-side camshaft.

13. A cylinder discrimination method of an engine comprising the steps of:
outputting cylinder discrimination signals at every uneven crank angle interval from a plurality of cam sensors;
discriminating a specific cylinder based on the cylinder discrimination signals output from said plurality of cam sensors; and
discriminating cylinders other than said specific cylinder based on the discriminated result of said specific cylinder and said cylinder discrimination signals from said cam sensors.

14. A cylinder discrimination method of an engine according to claim 13, wherein the specific cylinder is discriminated based on output characteristics of cylinder discrimination signals output from another cam sensor during a period of time from a previous output and a current output of cylinder discrimination signals from said respective cam sensors.

15. A cylinder discrimination method of an engine according to claim 14, wherein the number of output of cylinder discrimination signals from said another cam sensor is counted during the period of time from the previous output and the current output of cylinder discrimination signals from said respective cam sensors, and the specific cylinder is discriminated based on a difference in the number of said output.

16. A cylinder discrimination method of an engine according to claim 13, wherein the cycle of input of said cylinder discrimination signals is measured while cylinder discrimination signals output from the respective cam sensors are sequentially input, to discriminate the specific cylinder, based on a ratio of the most newly measured cycle and the previously measured cycle and the discrimination of the cam sensor from which the newest cylinder discrimination signal has been output.

17. A cylinder discrimination method of an engine according to claim 16, wherein the specific cylinder is discriminated when a value obtained by dividing said most newly measured cycle by said previously measured cycle exceeds a threshold value.

18. A cylinder discrimination method of an engine according to claim 13, wherein the cylinders other than said specific cylinder are discriminated based on the number of output of cylinder discrimination signals from a cam sensor corresponding to the cylinder to be discriminated, immediately after the discrimination of said specific cylinder.

19. A cylinder discrimination method of an engine according to claim 13, wherein the cylinders other than said specific cylinder are discriminated based on the total number of output of said cylinder discrimination signals from the respective cam sensors, immediately after the discrimination of said specific cylinder.

20. A cylinder discrimination method of an engine according to claim 13, further comprising the steps of:
outputting a crank angle signal from a crank angle sensor, in synchronism with the rotation of a crankshaft, capable of detecting a reference crank angle position for every stroke phase difference between the cylinders;
performing fault diagnosis of said crank angle sensor;
performing cylinder discrimination based on said detected reference crank angle position and cylinder discrimination signals from said cam sensor when said crank angle sensor is diagnosed as normal; and
performing cylinder discrimination based only on said cylinder discrimination signals output from said plurality of cam sensors only when said crank angle sensor is diagnosed to be abnormal.

21. A cylinder discrimination method of an engine according to claim 13, wherein an intake valve timing control device for varying an intake valve timing by changing a rotation phase of an intake-side camshaft with respect to the crankshaft is driven, to control the rotation phase of said intake-side camshaft to the most delayed rotation phase angle when said crank angle sensor is diagnosed to be abnormal.

22. A cylinder discrimination method of an engine according to claim 13, wherein an exhaust valve timing control device for varying an exhaust valve timing by changing a rotation phase of an exhaust-side camshaft with respect to the crankshaft is driven, to control the rotation phase of said exhaust-side camshaft to the most advance-angled rotation phase angle when said crank angle sensor is diagnosed to be abnormal.

23. A cylinder discrimination method of an engine according to claim 13, wherein said cylinder discrimination signals are output from cam sensors mounted correspondingly to each bank in a V-type engine.

24. A cylinder discrimination method of an engine according to claim 13, wherein said cylinder discrimination signals are output from cam sensors mounted correspondingly to an intake-side camshaft and an exhaust-side camshaft of said engine.

* * * * *